May 28, 1963 W. T. BLAKE 3,091,333
MACHINE FOR SEPARATING ARTICLES ACCORDING TO SIZE
Filed Jan. 3, 1961 7 Sheets-Sheet 1

*INVENTOR.*
WILLIAM T. BLAKE
BY
*his attorneys.*

May 28, 1963 W. T. BLAKE 3,091,333
MACHINE FOR SEPARATING ARTICLES ACCORDING TO SIZE
Filed Jan. 3, 1961 7 Sheets-Sheet 2

FIG.3

INVENTOR.
WILLIAM T. BLAKE
BY Cumpston & Shaw
his attorneys.

May 28, 1963 W. T. BLAKE 3,091,333
MACHINE FOR SEPARATING ARTICLES ACCORDING TO SIZE
Filed Jan. 3, 1961 7 Sheets-Sheet 3

*INVENTOR.*
WILLIAM T. BLAKE
BY
*his attorneys.*

May 28, 1963   W. T. BLAKE   3,091,333
MACHINE FOR SEPARATING ARTICLES ACCORDING TO SIZE
Filed Jan. 3, 1961   7 Sheets-Sheet 4

*INVENTOR.*
WILLIAM T. BLAKE
BY
Cumpston & Shaw
his attorneys.

May 28, 1963  W. T. BLAKE  3,091,333
MACHINE FOR SEPARATING ARTICLES ACCORDING TO SIZE
Filed Jan. 3, 1961  7 Sheets-Sheet 5

FIG. 10

INVENTOR.
WILLIAM T. BLAKE
BY *Cumpston + Shaw*
his attorneys.

United States Patent Office 3,091,333
Patented May 28, 1963

3,091,333
MACHINE FOR SEPARATING ARTICLES ACCORDING TO SIZE
William T. Blake, Canandaigua, N.Y., assignor to Tew Manufacturing Corporation, Fairport, N.Y., a corporation of New York
Filed Jan. 3, 1961, Ser. No. 80,392
14 Claims. (Cl. 209—82)

This invention relates to machines for separating or grading articles such, for example, as apples, peaches or other fruit or vegetable products, according to size and shape, one object of the invention being to provide an improved machine for such purposes which is more automatic and efficient in operation.

Another object is to supply a machine of this nature which is more precise and reliable in its functions.

Another object is the provision of a machine having the above advantages and which is more practical in construction and convenient in operation.

To these and other ends the invention resides in certain improvements and combinations of parts, all as will be hereinafter more fully described, the novel features being pointed out in the claims at the end of the specification.

The invention is embodied in the present instance, by way of illustration, in a machine comprising a pair of parallel paths or channels along each of which the articles are conveyed past one or more of three sizing heads, at each of which a lamp projects the profile or shadow image of an article on the conveyor belt to a plurality of photoelectric cells controlling means for ejecting articles of predetermined size or shape onto a second belt for delivery laterally of the machine. While the present machine has two parallel paths, it may comprise one or more such paths, along which the articles are conveyed simultaneously to one or more sizing heads, for separating articles into a plurality of grades of size and shape, as may be found desirable.

Figure 4:
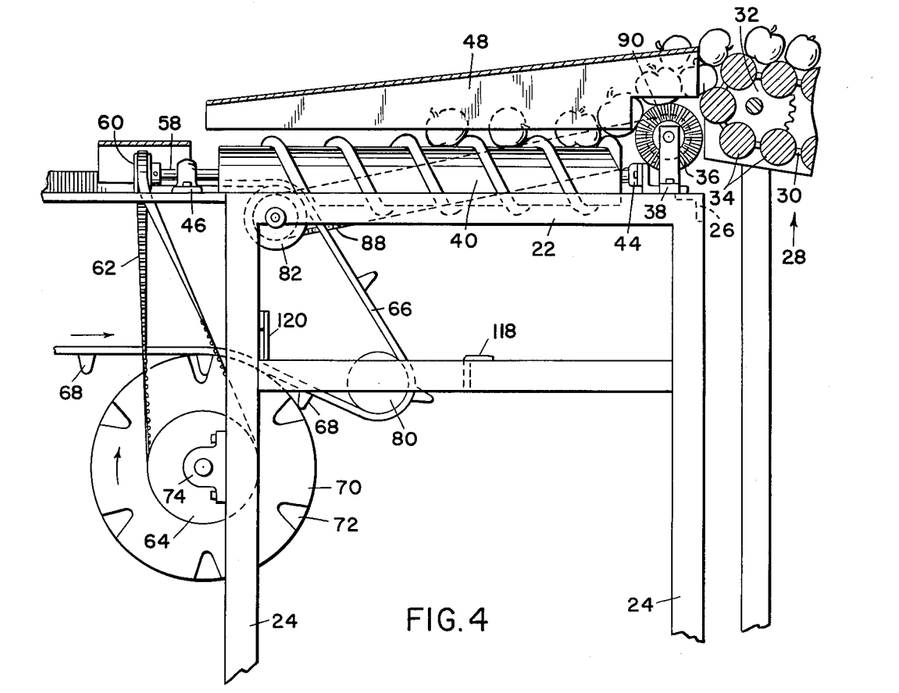
FIG. 4 is an enlarged side elevation, partly in section, of the intake end of the machine and associated parts.
Figure 12:
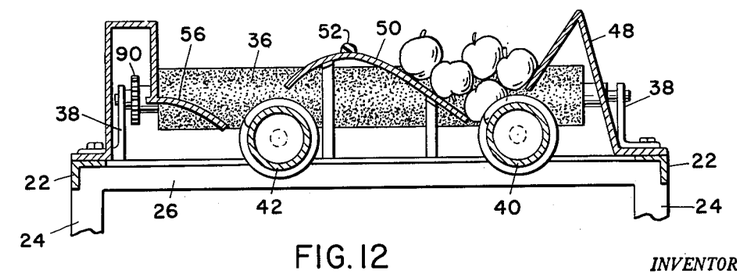
FIG. 12 is an enlarged, sectional elevation on the line 12—12 in FIG. 3.

The present embodiment of the machine preferably comprises an elongated frame 20 having longitudinally extending angle bars 22 (FIG. 12) on legs 24 connected by transversely extending bars, as 26 (FIG. 4) for supporting the various parts. The articles to be sized, in the present instance apples, are fed to the front or intake end of the machine by any known and suitable chute or belt feeding means indicated generally at 28 and shown in the present instance as comprising sprocket chains 30 on sprockets 32 and carrying transversely extending and closely spaced bars 34 to which the apples are supplied and by which they are fed to the intake of the machine.

Figure 1:
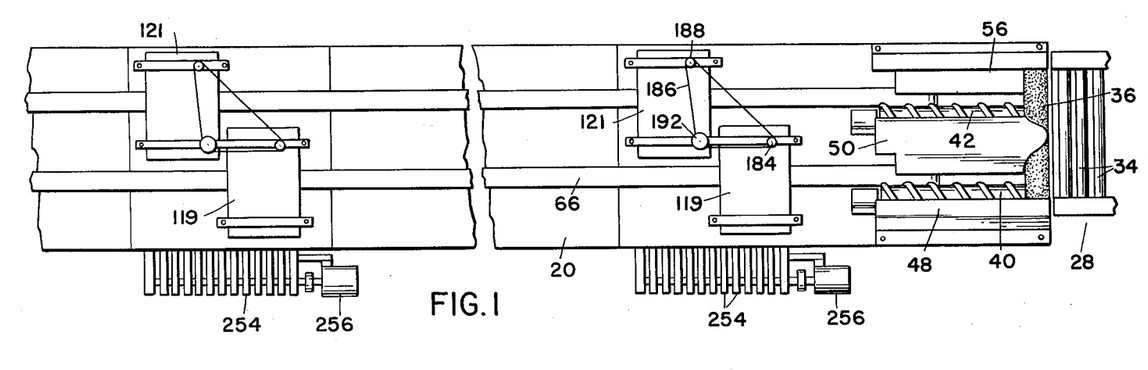
FIG. 1 is a schematic top plan view, partly broken away, of the intake or front end of the machine.
Figure 2:
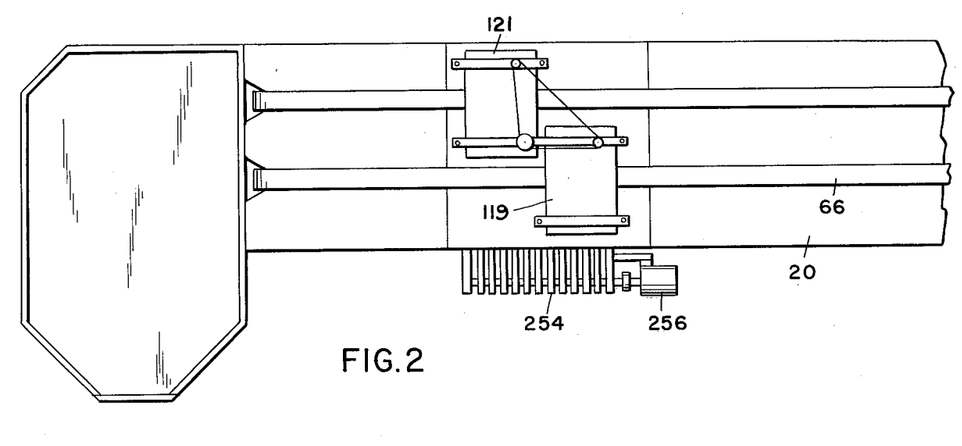
FIG. 2 is a similar view of the rear end of the machine.

The intake end of the machine comprises a transversely extending cylindrical feeding brush 36 (FIGS. 1, 4 and 12) having a central core with relatively long, spaced and flexible bristles and adapted to receive the articles from the feeding bars 34 and to feed the same gently, without bruising, to one or more longitudinal paths along which they are conveyed to the sizing heads. Brush 36 has its ends journalled in upstanding brackets 38 on the top of the table. Brush 36 thus delivers the apples to the forward end of each of a pair of parallel screw conveyors or worms, 40 and 42, each journalled at its ends in bearings as at 44 and 46 (FIG. 4) these worm conveyors having their spiral ribs so spaced from one another, as shown, that only one apple can be received between the adjacent spirals of each pitch length of the screw or worm.

The worm conveyors 40 and 42 are each partially shielded or shrouded by sheet metal plate guides which form, with each conveyor, a trough along which the apples are fed longitudinally of the machine in separated progression. Conveyor 40 is partly shielded by an angular guide plate 48 (FIGS. 1 and 12) bolted on the top of the machine frame. A curved intermediate plate 50 extends longitudinally between the conveyors and partially shields conveyor 42 with a longitudinally extending rib 52 ending in V-shaped branches 54 (FIG. 3) for distributing apples equally to the conveyors. Plate 50 forms with plate 48 a trough for conveyor 40 and forms a trough for conveyor 42 by cooperation with a guide plate 56 bolted on top of the frame and serving also to house a drive chain and sprocket for rotating brush 36, as hereafter described. Each of conveyors 40 and 42 has its rear journal 58 extended and provided with a sprocket-like or cleated wheel 60 positively engaged and driven by a sprocket chain or cleated belt 62 (FIG. 4) for driving the conveyors in positively timed coordination with the forward ends of a pair of cleated belt conveyors which carry the apples separately past the sizing heads, as hereafter described. Such cleated conveyor belts and sizing heads and their associated parts are substantially the same for each path through the machine so that a description in connection with one will suffice for each.

Each cleated belt 66 is compartmented by longitudinally spaced lugs or cleats 68 and runs above and in contact with a wheel 70 formed with peripheral notches 72 spaced to engage with the cleats 68 of the belt (FIG. 4) wheel 70 being fixed on a rotary shaft journalled at its opposite ends in bearings 74 on the frame legs. This shaft has fixed thereon for each conveyor a sprocket-like or cleated wheel 64 (FIG. 4) engaged by chain or belt 62 for driving its worm conveyor in timed coordination with notched wheel 70 as described.

Figure 6:
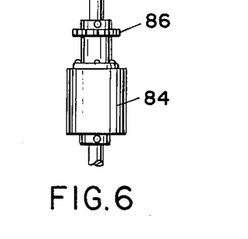
FIG. 6 is a top plan view, partly broken away, of another idler roll for the belt.

Belt 66 is maintained in contact with wheel 70 by an idler pulley 80, supported as hereafter described, from which the belt passes upwardly over an idler pulley 82 journalled on the frame in position to carry the forward end of the belt past the rear end of worm conveyor 40 and of its shield 48, in such position and timed relation that an apple is delivered from each valley of the worm between a pair of lugs or cleats of the belt. Idler pulley 84 (FIG. 6) of the other belt, which corresponds with pulley 82, has fixed thereto a sprocket wheel 86 driving a chain 88 which meshes with a sprocket 90 (FIGS. 4 and 12) fixed on the journal shaft of brush 36 to drive the same.

Figure 5:
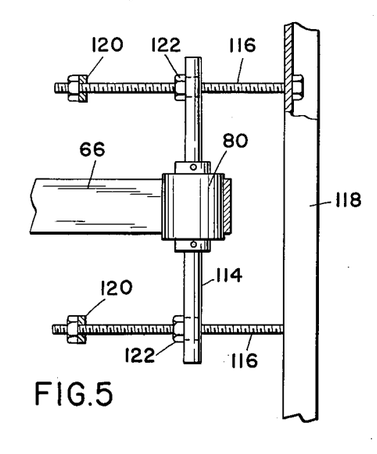
FIG. 5 is a fragmentary top plan view of an adjustable idler roll of a conveyor belt.
Figure 11:
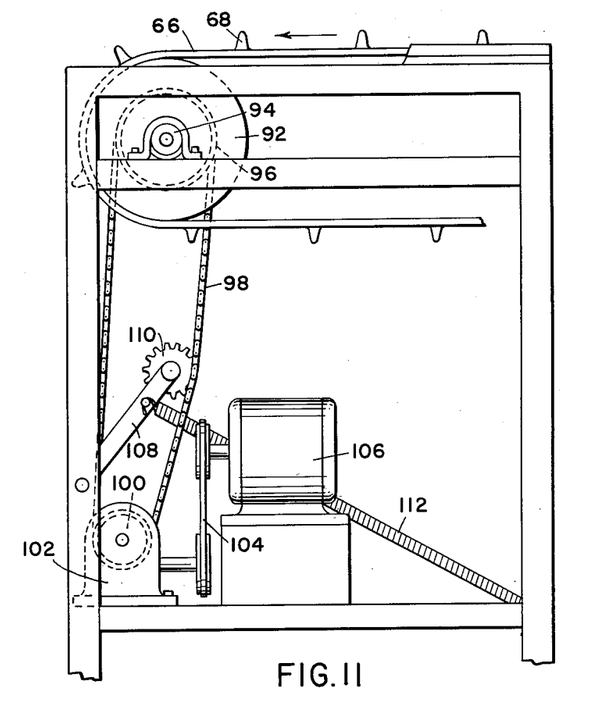
FIG. 11 is an enlarged side elevation of the rear end of the machine showing means for driving the conveyor belt.

Belt 66 engages at its rear end with a pulley 92 (FIG. 11) fixed on a shaft journaled in bearings 94 on the frame and having fixed thereon a sprocket 96 driven by a chain 98 passing at its lower end around a sprocket 100 at the low speed end of a reduction gearing 102 of any known or suitable variety and connected by a belt 104 with an electric motor 106 on the frame. An arm 108 pivoted on the frame carries a sprocket 110 meshing with chain 98 to maintain suitable tension therein under the pull of a coiled tension spring 112 (FIG. 11). Idler pulley 80 at the forward end of belt 66 is rotatably mounted between collars on a rod 114 (FIG. 5) having an opening therethrough at each end through which passes a threaded supporting rod 116. Each rod 116 is supported at one end by an angle bar 118 carried by the frame and at its other end by a strap 120 depending from the frame and a nut 122 on the rod serves for adjustment of the position of rod 114 to vary the tension of belt 66.

Figure 3:
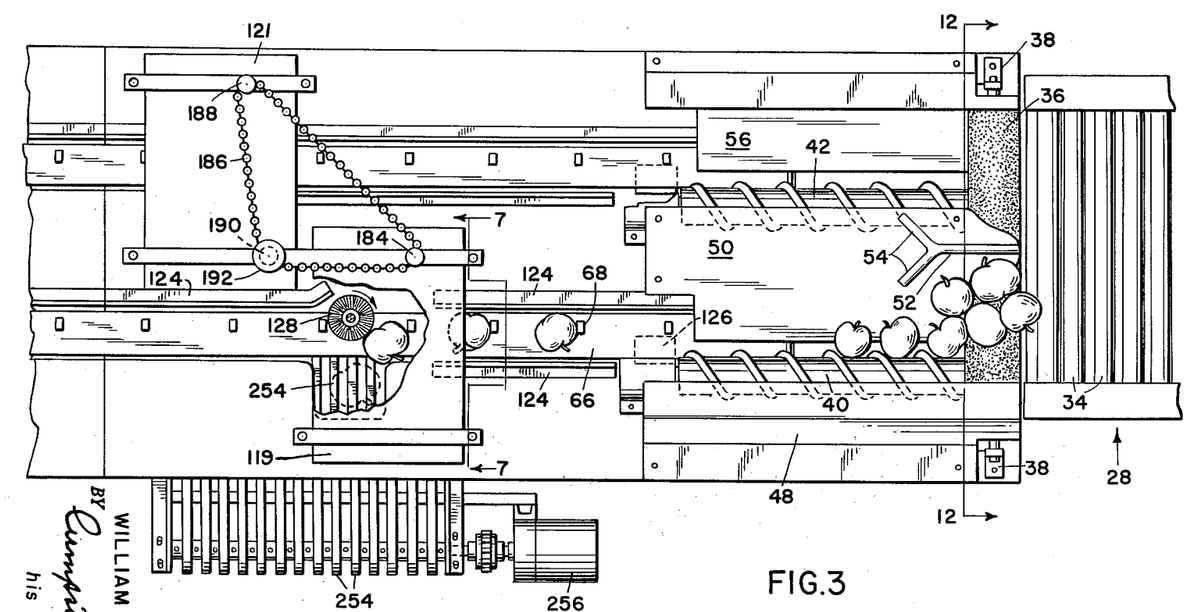
FIG. 3 is an enlarged top plan view, partly broken away, of the intake end of the machine and adjacent parts.
Figure 7:
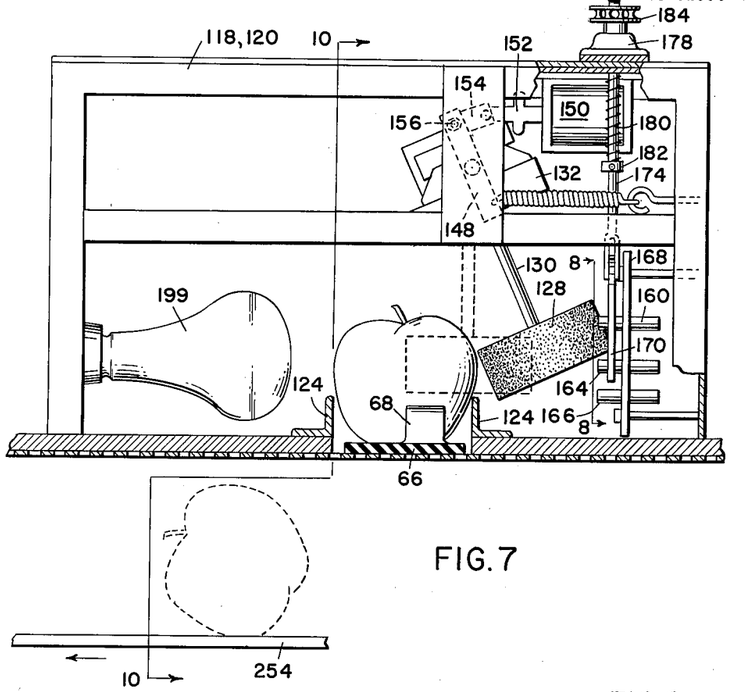
FIG. 7 is an enlarged sectional view on the line 7—7 of FIG. 3, showing article conveying and ejecting means and its photoelectric cell actuating means.

It is apparent from the above construction that the positive engagement between cleated belt 66 and notched wheel 70 and between the cleated belt or chain 62 and both the cleated wheel or sprocket 64 rotated by notched wheel 70 and the cleated wheel or sprocket 60 of conveyor worm 40, serves to maintain a suitable timed relation between the valleys of the worm conveyor and the cleat intervals of belt 66, so that one apple is properly delivered into each such interval on the belt. The frame is provided at each edge of the belt (FIGS. 3 and 7) with guide rails 124, to maintain the apples on the belt and the belt passes over an inclined block or wedge 126 at its edge adjacent the worm conveyor, so as to tilt the belt as it passes the end of the worm conveyor and position the apple uniformly at the edge of the belt opposite the worm conveyor (FIG. 3). As thus supplied to and positioned on the belt 66, the apples are carried in spaced and accurate position on the belt past the sizing heads, as 119 and 121, and the ejecting means, which will now be described.

Figure 10:
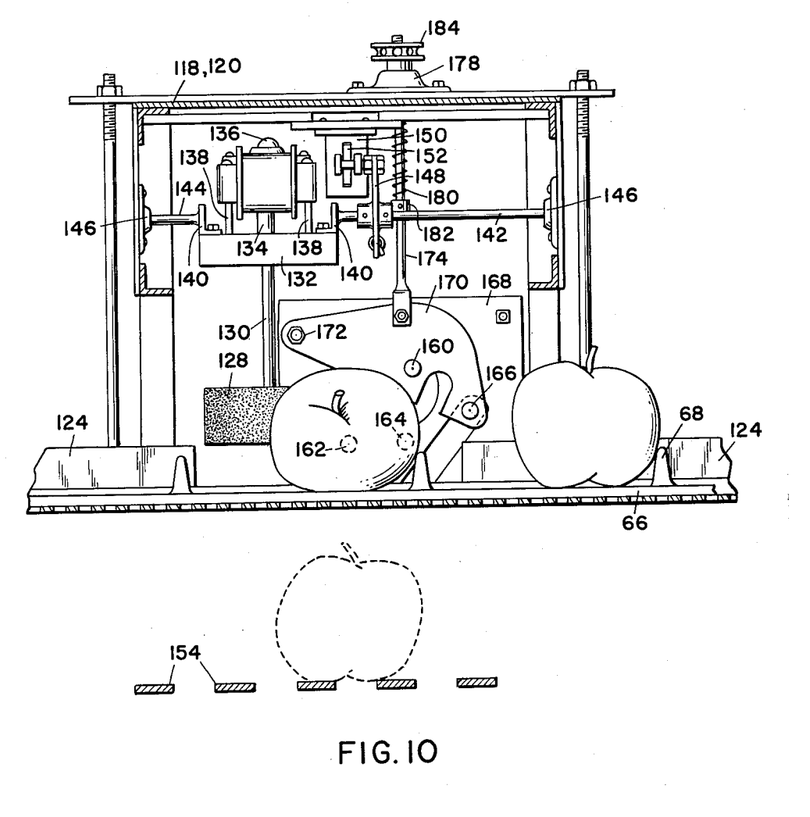
FIG. 10 is an elevation partly in section on the line 10—10 in FIG. 7 showing apples during ejection from the conveyor belt.

The means for ejecting an article of predetermined size preferably comprises a cylindrical brush 128 (FIGS. 3, 7 and 10) having flexible bristles as described in connection with feeding brush 36 and fixed on the lower end of a depending rotary shaft 130. Shaft 130 is carried at its upper end by the low speed end of a speed reduction gearing of any known and suitable variety, in a casing 132. Such gearing is driven by the shaft 134 of an electric motor 136 having its casing connected by brackets 138 with the casing 132 of the reduction gearing. Brackets 140 bolted to casing 132 are fixed on the ends of spaced shafts 142 and 144 which have their opposite ends journalled to rock in bearings 146 on the machine frame. It is apparent from this construction that ejector brush 128 is movable to swing transversely of conveyor belt 66 and toward the path of an apple as it is moved along by the belt and the rotating brush sweeps the apple from the belt to lateral delivery means described below.

The means for rocking ejector brush 128 preferably comprises a bar 148 (FIGS. 7 and 10) fixed intermediate its ends on shaft 142 for rocking movement of its upper end toward and from a solenoid 150 supported to depend from the top of the machine frame. The solenoid core 152 has pivotally connected therewith one end of a link 154 having its other end pivoted at 156 with the upper end of bar 148, so that when the solenoid is energized to retract its core, brush 128 is swung to the vertical position shown in boken lines in FIG. 7, to brush an apple from belt 66. Solenoid 150 is energized by connection in the circuit of the machine which includes a group of photoelectric sizing cells now to be described.

The photoelectric cells (FIGS. 7–10), of the selenium or other known suitable type, are each mounted in a small tube so as to let only a small, well-defined and precisely directed beam of light reach each cell. These cells, 160, 162, 164 and 166, are mounted horizontally in supporting plate means so as to direct each cell transversely of the belt 66. Cells 162 and 164 are stationarily mounted in a plate 168 supported on the frame of the machine, while cells 160 and 166 are mounted in a plate 170 pivoted at 172 to plate 168. Plate 170 is supported and adjusted vertically by a rod 174 pivoted thereto at its lower end 176 and having its upper end passing adjustably through and supported in a self-aligning bearing 178, of any known and suitable construction, mounted on the top of the machine frame. A spring 180 coiled about the rod between a collar 182 thereon and bearing 178 serves to hold the rod precisely seated in its bearing. The upper end of rod 174 is threaded and has threadedly engaged therewith a notched or toothed wheel 184, supported on the bearing part through which the rod passes. The rotation of wheel 184 serves to adjust rod 174 longitudinally in its bearing part.

Wheel 184 is positively rotated by an endless chain 186 of the known alternate ball and link type (FIG. 3) which passes in similar engagement with a similar wheel 188 on the adjacent sizing head 121 and in similar engagement also with a wheel 190 having a hand-operated portion or knob 192 by which the photoelectric cells of adjacent heads are simultaneously and similarly adjusted for controlling the size of article ejected at such sizing heads. Wheels 184, 188 and 190 have a slight movement corresponding to the slight lateral movement of rod 174 as pivoted plate 170 is raised and lowered, but since each wheel 184 is closely adjacent to the point of support of each rod 174, such lateral motion is negligible. Plates 168 and 170 are apertured at 194, 196 and 198 to allow movement of cells 160 and 166 and plate 170 and without interference or obstruction of any cell.

For projecting light to activate the photoelectric cells, a lamp 199 is mounted on the machine frame (FIG. 7) at substantially the level of the articles carried by the belt 66 and on the side of the belt opposite the cells so as to project a shadow image or profile of each article on the cells. It will be noted that cell 160 (FIGS. 8 and 9) is located at an adjustable vertical distance above the belt and above cells 162, 164 and 166, and cell 166 is located at a variable horizontal distance longitudinally of the belt from cell 164, both being adjusted by adjustment of plate 170 as described above. When light from lamp 199 is unobstructed by an article and falls on a cell, the cell transmits current in the circuit in which it is connected. When light from the lamp is obstructed by an article and its profile shadow falls on a cell, the cell opposes a high resistance to the transmission of current, as well understood in the art relating to such cells.

Figure 8:
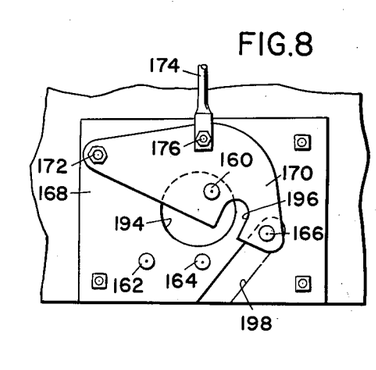
FIG. 8 is a fragmentary elevation as seen from the line 8—8 in FIG. 7, showing adjustable photoelectrical cell means for sizing and ejecting the articles.
Figure 9:
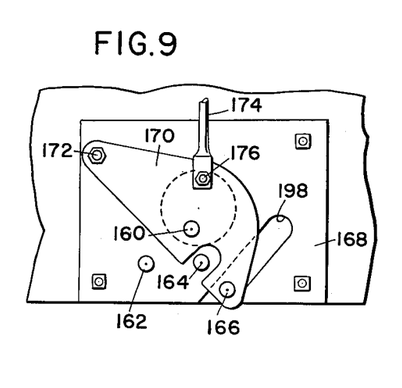
FIG. 9 is a view similar to FIG. 8 showing the parts in a different position.

An article may have such size and shape as to simultaneously obstruct all of the cells, or it may have such height in its vertical diameter above the belt as to obstruct cell 160 without simultaneously obstructing all of cells 162, 164 and 166. Again, an article may have such width in its horizontal diameter along the belt as to block light simultaneously from all of cells 162, 164 and 166 without however blocking light from the upper cell 160. By suitable variations in the circuit connections, the cells may be employed to size articles in these different relations to each other of the transverse axes of the shadows which are cast on the cells, as found desirable in the sizing of articles of different kinds. Thus, in sizing peaches, for example, which tend to have transverse profile axes of nearly uniform length, both diameters should be above a selected minimum length, to bring about ejection from the belt, so that the object is measured in such case by the smaller of these two diameters. Apples, on the other hand, may have either diameter substantially longer than the other and only one diameter needs to be above a certain length to warrant ejection from the belt, so that in this case the article is sized by the larger of the two diameters. To adapt the machine selectively to these different functions, the connections of the cells in the circuitry of the machine are arranged under control of a double-pole, double-throw switch, as hereafter described, to enable the cells to activate the ejector brush 128 in accordance with the particular size and shape characteristic of the article with reference to which the sizing is desired, it being understood that during ejection of an article on the basis of each different characteristic, the dimensions of the diameters selected for blocking light to the cells may be varied by varying the positions of the cells by raising or lowering plate 170, as shown in FIGS. 8 and 9.

Referring to the circuitry of the machine and wiring diagram (FIG. 13) conducting lines 200 and 202, leading from a source of power, as 117 volts A.C., are bridged by a resistance 204. This resistance is tapped and split at 206 by a line 208 containing a rectifier unit 210, so that a lower voltage of about 24 volts D.C. is provided between lines 200 and 208. Line 200 leads to the movable contact 212 of a relay, of known or suitable construction, indicated generally at 214. When the coil 216 of this relay is energized by current from the amplifying means hereafter described, movable contact 212 engages stationary contact 218 and current passes through line 220 and through cells 164 and 166 when subjected to light from lamp 199. Current also flows from line 200, independently by passing the relay, through line 222 and through cell 162 when subjected to light. Cells 162, 164 and 166 are connected in parallel with contacts 224 and 226 of a double-pole, double-throw switch indicated generally at 228. The remaining contact 230 of the switch is connected by a line 232 with line 220 in parallel with cells 164 and 166. One center pole or pole pivot of the switch is connected by line 234 through cell 160 and line 236 with an amplifier means indicated generally at 238, of any known and suitable two-step type. The other pole pivot of the switch is connected to line 236 and the amplifier. When the switch is thrown upwardly in engagement with contacts 226 and 230, current flows through the relay contact 218, cells 160, 164 and 166, and through cell 162 independently of the relay, in parallel through all four cells while exposed to light and to the amplifier. This connection of the cells is shown in detail in FIG. 14 and corresponds to sizing of an article, such as a peach, with reference to a minimum size of its smallest diameter, as described above.

When switch 228 is thrown downwardly to engage contact 224 only, current flows through relay coil 216, and in parallel through cells 164 and 166 when subjected to light. Current flows also through cell 162 when subjected to light, independently of the relay and the current from all three cells 162, 164 and 166 flows to switch contact 224, through the switch, in series through cell 160 and thence to the amplifier. This arrangement is shown in schematic detail in FIG. 15 and corresponds to the sizing of an article such as apples by reference to its largest diameter only as described above.

Figures 13, 14, 15:
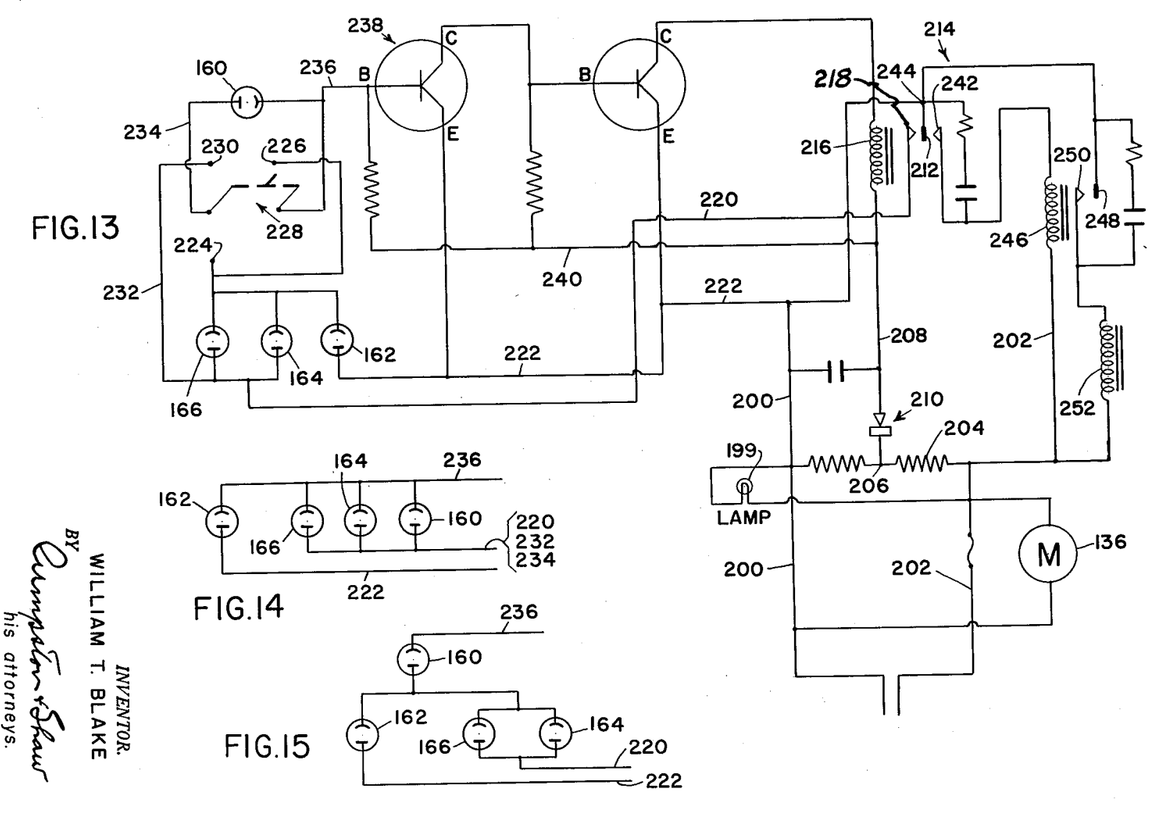
FIG. 13 is a wiring diagram for the machine.
FIG. 14 shows a switch controlled wiring detail.
FIG. 15 is similar to FIG. 14, but showing a different wiring detail as controlled by said switch.

From the two-step amplifier 238, current energizes relay coil 216 when any of the cells is exposed to light in the arrangement of FIG. 14 and when cell 160 together with any of the cells 162–166 are exposed to light in the arrangement of FIG. 15. The amplifier is connected through line 240 to line 208 and the other side of the low voltage, D.C. circuit.

When light through all of the cells is blocked by an article, relay contact 212 moves into engagement with an opposite contact 242 and current in one side of the A.C. circuit divides at 244, passing partly through contact 242, relay coil 246, and line 202 to the other side of the A.C. circuit. This energizing of coil 246 draws the movable contact 248 of a second stage of the relay into engagement with its contact 250 and sends part of the current through the coil 252 of the solenoid 150 described above which activates brush 128 to eject an article from belt 66. Coil 252 is connected by line 202 with the other side of the A.C. circuit. Such relay means may be of any known and suitable construction and is presently provided with two stages to reduce the contact capacity otherwise required of each stage under the full A.C. voltage, but a single stage relay of sufficient contact capacity for this purpose may be used instead.

In operation, as apparent from the above description, when each diameter of an article of relatively uniform shape, such as a peach, blocks off all light to the cells, with switch 228 thrown upwardly, current through all the cells is stopped and relay 214 is activated to swing brush 128 to a vertical position and eject the article from the conveyor belt from which it rolls onto transversely extending conveying means such as a plurality of narrow conveyor belts 254 (FIG. 3) driven by motor 256, for delivery to suitable receiving means at one side of the machine. If either diameter is too small, so that light passes through one or more of the cells to the amplifier, the brush is not activated and the peach continues onto a second stage of sizing, or other suitable disposition.

With switch 228 thrown downwardly, as in sizing apples, a vertical diameter of sufficient length serves to block off light from the cell 160 and a horizontal diameter of sufficient length blocks off light from cells 162–166, either condition resulting in ejection. Cell 162 is specially connected in the circuit to bypass the relay, for restoring the relay to its normal position after activation of the relay to eject an article. For this purpose, the relative positions of cell 162 and brush 128, longitudinally of belt 66, are so coordinated that after an article has blocked off light from this cell and been ejected by the brush, such ejection restores light through cell 162 for a brief instant of time long enough however to retract brush 128 before the next article reaches the light cells. This follows from the fact that cells 160, 164 and 166 are connected through the relay contacts 212 and 218 in series with the amplifier and so cannot transmit current to energize the relay coil 216 while contacts 212 and 218 are open and contacts 212 and 242 remain closed. The article blocks light to cell 162 while contacts 212 and 242 are closed to energize the solenoid of the ejector circuit, but the ejection of the article is timed to permit light to pass through cell 162 so that it can transmit current through the amplifier to energize coil 216 and close contacts 212 and 218, thus restoring the connections to condition for the sizing of the next succeeding article.

It is apparent from the above description of the construction and operation of the machine that the invention is highly effective in accomplishing its stated objectives and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. An article sizing machine comprising means including a compartmented belt for receiving and conveying articles in separated succession, brush means for ejecting an article of predetermined size from said belt, electrical circuit means including a plurality of photoelectric cells positioned to correspond substantially with each of a pair of dimensions of a light image projected on said cells from an article on said belt, for response to the lengths of said dimensions, means for amplifying current transmitted by said cells, and relay means controlled by said amplifying means and cells for actuating said ejecting means to eject an article of predetermined size.

2. An article sizing machine as claimed in claim 1 comprising means for selectively adjusting the relative positions of said cells to effect the response thereof to projected dimensions of said article of different predetermined lengths.

3. An article sizing machine as claimed in claim 1 comprising a plurality of said cells positioned to correspond substantially with a horizontal dimension of said projected image and one of said cells positioned to correspond with an extremity of a vertical dimension of said image, for response to the lengths of said dimensions of an article on said belt.

4. An article sizing machine as claimed in claim 1 comprising a support, a plurality of said cells stationarily mounted on said support in spaced relation with one another longitudinally of said belt, a member mounted on said machine for movement longitudinally of said belt and having a plurality of said cells mounted thereon, a lamp for projecting on the area of said cells an image of an article on said belt, and means for moving said member to different positions to vary the spaced relations of said stationary and movable cells to effect the response thereof to projected images of articles of different sizes on said belt.

5. An article sizing machine as specified in claim 1 comprising a first set of connections in said circuit means for connecting all of said cells therein for energizing said amplifying means to correspond simultaneously with both of said pair of dimensions, a second set of connections in said circuit means for connecting said cells therein for energizing said amplifying means to correspond separately with said dimensions, and switch means for selectively including in said circuit means either said first or second set of connections for sizing articles of different kinds and shapes.

6. A machine for separating articles according to size comprising article feeding means, screw conveyor means for receiving and conveying said articles in separated succession, compartmented belt means for receiving and conveying one of said articles in each compartment thereof, rotary brush means for feeding said articles to said screw conveyor means and for ejecting said articles from said belt means, photoelectric cell means responsive to the size of each article conveyed in a compartment of said belt and means actuated by said cell means for actuating said brush ejecting means.

7. A machine for separating articles according to size comprising article feeding means, screw conveyor means for receiving and conveying said articles in separated succession, guide plate means extending longitudinally of and partially enclosing said screw conveyor means for guiding said articles separately into and retaining them in the convolutions thereof while being conveyed thereby, compartmented belt means for receiving and conveying one of said articles in each compartment thereof, photoelectric cell means responsive to the size of each article conveyed in a compartment of said belt and means actuated by said cell means for ejecting articles of a predetermined size.

8. A machine for separating articles according to size comprising article feeding means, screw conveyor means for receiving and conveying said articles in separated succession, compartmented belt means for receiving and conveying one of said articles in each compartment thereof, means driven by said belt means and connected to said screw conveyor means for driving the same in timed coordination with said belt means, photoelectric cell means responsive to the size of each article conveyed in a compartment of said belt and means actuated by said cell means for ejecting articles of a predetermined size.

9. A machine for separating articles according to size comprising article feeding means, screw conveyor means for receiving and conveying said articles in separated succession, compartmented belt means for receiving one of said articles in each compartment thereof, said belt means being provided with spaced lugs forming article receiving compartments, a wheel peripherally engaging said belt means and formed with notches meshing with said lugs for positively rotating said wheel, means connecting said wheel with said screw conveyor means to drive the same in positively timed coordination with said belt means, photoelectric cell means responsive to the size of each article conveyed in a compartment of said belt means, and means actuated by said cell means for ejecting articles of a predetermined size.

10. A machine for separating articles according to size comprising article feeding means, screw conveyor means for receiving and conveying said articles in spaced succession, compartmented belt means for receiving and conveying one of said articles in each compartment thereof, and an idler pulley rotated by said belt means, rotary brush means for feeding said articles to said screw conveyor means, means connecting said idler pulley to said brush means for rotating the same, photoelectric cell means responsive to the size of each article conveyed in a compartment of said belt and means actuated by said cell means for ejecting articles of a predetermined size from the compartments of said belt.

11. A machine for separating articles according to size, comprising article feeding means, screw conveyor means for receiving and conveying said articles in separated succession, compartmented belt means for receiving and conveying one of said articles in each compartment thereof, photoelectric cell means responsive to the size of each article conveyed in a compartment of said belt, a rotary brush, means mounting said brush for movement to engage and eject an article from said belt means and means actuated by said photoelectric cell means for effecting said ejecting movement of said brush.

12. A machine for separating articles according to size comprising article feeding means, screw conveyor means for receiving and conveying said articles in separated succession, compartmented belt means for receiving and conveying one of said articles in each compartment thereof, photoelectric cell means responsive to the size of each article conveyed in a compartment of said belt, a frame movably mounted on said machine, a shaft rotatably mounted on said frame and provided with a brush, a motor on said frame for rotating said brush, a solenoid on said machine connected to said frame to move the same and said brush to engage and eject an article from said belt means, and means actuated by said cell means for operating said solenoid.

13. A machine for separating articles according to size comprising article feeding means, screw conveyor means for receiving and conveying said articles in separated succession, guide plate means extending longitudinally of and partially enclosing said screw conveyor means for guiding said articles separately into and retaining them in the convolutions thereof while being conveyed thereby, compartmented belt means for receiving and conveying one of said articles in each compartment thereof, photoelectric cell means responsive to the size of each article conveyed in a compartment of said belt and rotary brush means for feeding said articles to said screw conveying means and for ejecting said articles from said belt means.

14. A machine for separating articles according to size comprising article feeding means, screw conveyor means for receiving and conveying said articles in separated succession, guide plate means extending longitudinally of and partially enclosing said screw conveyor means for guiding said articles separately into and retaining them in the convolutions thereof while being conveyed thereby, compartmented belt means for receiving and conveying one of said articles in each compartment thereof, means driven by said belt means and connected to said screw conveyor means for driving the same in timed coordination with said belt means, photoelectric cell means responsive to the size of each article conveyed in a compartment of said belt means, and means actuated by said cell means for ejecting articles of a predetermined size from the compartments of said belt.

References Cited in the file of this patent

UNITED STATES PATENTS

| | | |
|---|---|---|
| 1,052,499 | McIntosh | Feb. 11, 1913 |
| 1,832,035 | Leib | Nov. 17, 1931 |
| 1,843,283 | Howson | Feb. 2, 1932 |
| 2,033,645 | Parkhill | Mar. 10, 1936 |
| 2,433,946 | Gause | Jan. 6, 1948 |
| 2,787,358 | Cox | Apr. 2, 1957 |
| 2,934,207 | Steber | Apr. 26, 1960 |